US010887507B2

(12) United States Patent
Beach

(10) Patent No.: US 10,887,507 B2
(45) Date of Patent: Jan. 5, 2021

(54) INTELLIGENT SELF-POWERED CAMERA

(71) Applicant: ObjectVideo Labs, LLC, Tysons, VA (US)

(72) Inventor: Allison Beach, Leesburg, VA (US)

(73) Assignee: ObjectVideo Labs, LLC, Tysons, VA (US)

(*) Notice: Subject to any disclaimer, the term of this patent is extended or adjusted under 35 U.S.C. 154(b) by 116 days.

(21) Appl. No.: 16/161,597

(22) Filed: Oct. 16, 2018

(65) Prior Publication Data

US 2019/0132510 A1 May 2, 2019

Related U.S. Application Data

(60) Provisional application No. 62/580,188, filed on Nov. 1, 2017.

(51) Int. Cl.
*H04N 5/232* (2006.01)
*H04N 5/33* (2006.01)
(Continued)

(52) U.S. Cl.
CPC ......... *H04N 5/23218* (2018.08); *G06F 9/542* (2013.01); *G06K 9/00362* (2013.01);
(Continued)

(58) Field of Classification Search
CPC .......... H04N 7/18; H04N 7/181; H04N 7/188; H04N 21/23412; H04N 21/44012; H04N 5/23299; H04N 5/272; H04N 5/76; H04N 5/23218; H04N 5/232; H04N 5/23258; H04N 5/33; G06K 9/627; G06K 9/00; G06K 9/00288; G06K 9/00369;
(Continued)

(56) References Cited

U.S. PATENT DOCUMENTS 7,471,334 B1 12/2008 Stenger
7,534,056 B2 5/2009 Cross et al.
(Continued)

FOREIGN PATENT DOCUMENTS

EP 1286539 2/2003

OTHER PUBLICATIONS

PCT International Search Report and Written Opinion in International Application No. PCT/US18/58094, dated Jan. 15, 2019, 10 pages.
PCT International Preliminary Report on Patentability in International Application No. PCT/US2018/058094, dated May 14, 2020, 9 pages.
(Continued)

*Primary Examiner* — Diane D Mizrahi
(74) *Attorney, Agent, or Firm* — Fish & Richardson P.C.

(57) ABSTRACT

Methods, systems, and apparatus, including computer programs encoded on a computer storage medium, for monitoring wildlife using a self-powered camera. The methods, systems, and apparatus include actions of detecting an object near a camera, in response to detecting the object near the camera, classifying the object as a particular type of animal based on an appearance of the object in an image captured by the camera, determining whether to provide a notification regarding the image based on the particular type of animal that the object is classified as, and in response to determining to provide a notification regarding the image based on the particular type of animal that the object is classified as, providing the notification regarding the image.

19 Claims, 2 Drawing Sheets

(51) Int. Cl.
*G06K 9/00* (2006.01)
*G06N 3/04* (2006.01)
*G06T 7/20* (2017.01)
*G06F 9/54* (2006.01)
*H04N 7/18* (2006.01)

(52) U.S. Cl.
CPC ........... *G06K 9/00718* (2013.01); *G06N 3/04* (2013.01); *G06T 7/20* (2013.01); *H04N 5/232* (2013.01); *H04N 5/23258* (2013.01); *H04N 5/33* (2013.01); *H04N 7/188* (2013.01); *G06T 2207/20081* (2013.01)

(58) Field of Classification Search
CPC ........... G06K 9/00791; G06K 9/00362; G06K 9/00718; G06N 3/04; G06N 3/08; G06N 5/046; G06T 7/20; G06T 2207/20081; G06F 9/542
See application file for complete search history.

(56) References Cited

U.S. PATENT DOCUMENTS

| 9,075,292 | B1 | 7/2015 | Brown |
| 2009/0324010 | A1 | 12/2009 | Hou |
| 2010/0322483 | A1 | 12/2010 | Margolis et al. |
| 2017/0024618 | A1 | 1/2017 | Morales Teraoka et al. |
| 2017/0132848 | A1 | 5/2017 | Fyke |
| 2018/0018508 | A1* | 1/2018 | Tusch ................ G06K 9/00771 |

OTHER PUBLICATIONS

Chen et al, "Deep convolutional neural network based species recognition for wild animal monitoring," 2014 IEEE International Conference on Image Processing (ICIP), IEEE, Oct. 27, 2014, pp. 858-862, XP032966714.

Rosales Elias et al, "Where's the Bear? —Automating Wildlife Image Processing Using IoT and Edge Cloud Systems," 2017 IEEE/ACM Second International Conference on Internet-of-Things Design and Implementation (IOTDI), ACM, Apr. 18, 2017, pp. 247-258, XP033106267.

Nguyen et al, "Animal Recognition and Identification with Deep Convolutional Neural Networks for Automated Wildlife Monitoring," 2017 IEEE International Conference on Data Science and Advanced Analytics (DSAA), IEEE, Oct. 19, 2017, pp. 40-49, XP033303081.

Yousif et al, "Object segmentation in the deep neural network feature domain from highly cluttered natural scenes," 2017 IEEE International Conference on Image Processing (ICIP), IEEE, Sep. 17, 2017, pp. 3095-3099, XP033323145.

Nova Silvy, "Excerpt," The Wildlife Techniques Manual: vol. 1: Research, 7th edition, Mar. 1, 2012, p. 313, XP055747061.

Druzhkov et al, "A survey of deep learning methods and software tools for image classification and object detection," Pattern Recognition, Image Analysis, Allen Press, Lawrence, KS, US, Jul. 23, 2016, vol. 26, No. 1, pp. 9-15, XP036013091.

Extended European Search Report in European Application No. 18872554.3, dated Nov. 23, 2020, 13 pages.

* cited by examiner

INTELLIGENT SELF-POWERED CAMERA

CROSS REFERENCE TO RELATED APPLICATIONS

This application claims benefit of U.S. Provisional Application No. 62/580,188, filed on Nov. 1, 2017, titled "INTELLIGENT TRAIL CAMERA," which is incorporated by reference in its entirety.

TECHNICAL FIELD

This disclosure application relates generally to monitoring systems, and more particularly, to monitoring wildlife.

BACKGROUND

Trail cameras may be used by hunters. For example, some trail cameras may have heat sensing motion detectors and in response to detecting a hot source has newly appeared, capture an image and store the image on a memory card inside the camera. A hunter may then later retrieve the memory card from the camera and view the images stored on the memory card.

SUMMARY

Techniques are described for monitoring wildlife using a self-powered camera.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for monitoring wildlife using a self-powered camera. A self-powered camera may be considered self-powered as it may be powered by a battery enclosed within the camera or solar panels embedded in the camera. Self-powered cameras such as trail cameras, also referred to as game cameras, have grown into a huge business. One of the problems with self-powered cameras is that in order to view images taken by the cameras, a hunter may need to go to each camera and collect memory cards from the camera. When the hunter collects the memory card from the camera, the hunter may disturb the exact area the hunter is monitoring with the camera. Additionally or alternatively, a property owner that is not a hunter may still wish to view wildlife on their property and similarly need to collect the memory card from the camera.

To avoid requiring a person to physically collect a memory card from a self-powered camera, self-powered cameras may transmit images wirelessly, e.g., over radio or cellular communications. However, radio in a dense area may require frequent repeaters and have limited bandwidth. Additionally, cellular, radio, and Wi-Fi solutions may be expensive both in terms of data costs and battery life when uploading many images.

To reduce bandwidth usage and increase battery life, a self-powered camera may intelligently determine whether to send an image. For example, a user of a self-powered camera may not want to pay for the bandwidth usage and battery usage for receiving dozens of pictures of squirrels so may specify that the user only wants to receive images of deer. In the example, the self-powered camera may then only send images of deer to the user. In some implementations, the self-powered camera may send images of particular types of wildlife by classifying wildlife in each image by type of animal using a trained neural network, and then determine whether to transmit the image based on the classification.

Figure 1:
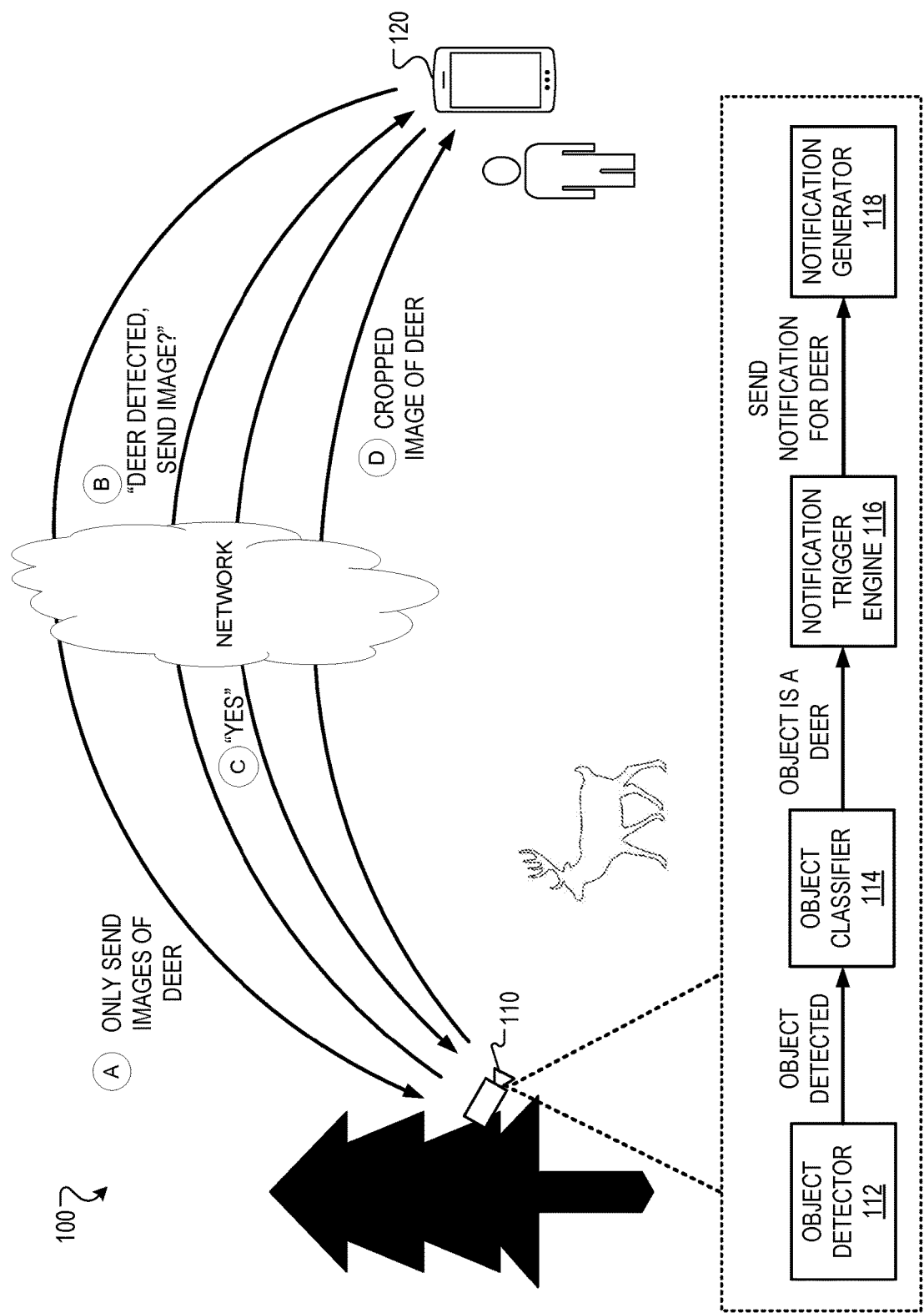
FIG. 1 illustrates an example block diagram of monitoring wildlife using a self-powered camera.

FIG. 1 illustrates an example block diagram of system 100 for monitoring wildlife using a self-powered camera 110. The system 100 includes the self-powered camera 110 and a user device 120. The self-powered camera 110 may provide images of wildlife to the user device 120 for a user to view the images on the user device 120. A user device 120 may be a phone, a tablet, a laptop, a desktop computing, or some other type of computing device.

The user device 120 may initially be used by a user to specify types of wildlife for which the user would like to receive images (Step A). For example, the self-powered camera 110 may have a cellular connection, be associated with a phone number of (123) 456-7890, and the user may use the user device 120 to send a Short Message Server (SMS) text message to the phone number with text of "Only send images of deer." The self-powered camera 110 may receive and store the specification of types of wildlife to provide notifications. For example, the self-powered camera 110 may receive the text message "Only send images of deer" from a phone with the phone number "(987) 654-3210" and store a rule to only send notifications of deer to the phone number "(987) 654-3210."

The self-powered camera 110 may later detect a moving object, determine that the object is a deer, and then indicate to the user device 120 that an image of a deer has been captured (Step B). For example, the self-powered camera 110 may detect an object through a heat sensor, in response capture an image, classify from the captured image that the object is a deer, and, in response to determining that the object is classified as a type of wildlife the user has requested to receive notifications of, send a text of "Deer detected, send image?"

The user device 120 may be used by the user to request the image (Step C). For example, the user may use the user device 120 to send back a text message of "Yes." The self-powered camera 110 may receive the request and, in response, send an image of the deer (Step D). For example, the self-powered camera 110 may crop the image to the portions that show the deer to reduce a size of transmission, thereby also reducing bandwidth and battery power usage, and send the image through a multimedia messaging service (MMS) message to the user device 120. The camera 110 may crop an image by resizing the image to the smallest rectangular sub-portion of the image that includes the entire deer.

While the above examples describes the use of SMS and MMS messages over a cellular connection. The self-powered camera 110 and user device 120 may also communicate through other forms of communication, e.g., radio frequency to a communication base stations that converts the transmission to internet access. For example, the self-powered camera 110 may be associated with an e-mail address and communications between the self-powered camera 110 and the user device 120 may be through e-mail messages instead of SMS and MMS messages.

The self-powered camera 110 may include an object detector 112, an object classifier 114, a notification trigger engine 116, and a notification generator 118. The object detector 112 may detect an object in a field of view of the self-powered camera 110. For example, the self-powered camera 110 may include a heat sensor, e.g., a passive infrared sensor (PIR sensor), and the object detector 112 may detect an object in the field of view of the self-powered camera 110 based on the heat sensor detecting a new source of heat. In another example, the object detector 112 may analyze images captured by the self-powered camera 110 and in response to detecting changes in images that correspond to a moving object, detect an object in the field of view of the self-powered camera 110. In some implementations, the object detector 112 may include a neural network that is trained to detect a moving object in images.

Additionally or alternatively, the object detector 112 may detect an object based on both determining that a heat sensor has detected a new source of heat and changes in images correspond to a moving object. For example, the object detector 112 may detect a new source of heat through a PIR sensor, in response to detecting the new source of heat through the PIR sensor, start to capture images and analyze the images to detect a moving object in the images. Analyzing images for a moving object may be more processing and power intensive than detecting a new heat source through a heat detector so this approach may conserve processing and power.

The object classifier 114 may classify an object in an image captured by the self-powered camera 110. For example, the object classifier 114 may obtain an image captured by the self-powered camera 110 when the object detector 112 detected an object, and classify the object in the image as a deer, a squirrel, a turkey, or some other type of object. In some implementations, classifying an object may be more processing or power intensive than detecting movement and the self-powered camera 110 may conserve battery by only attempting to classify an object in an image using the object classifier 114 if the object detector 112 detects an object in the image.

The object classifier 114 may classify objects in images by using a neural network that has been trained to classify objects from images. The neural network of the object classifier 114 may be trained with a set of training inputs that are images of different types of animals and training outputs that are classifications of the different types of animals in the images. For example, the object classifier 114 may be trained with a set of images of deer labeled as deer, a set of images of turkeys labeled as turkeys, and a set of images of humans labeled as humans and then learn to classify objects that appear similarly to the objects in the different sets as those types of objects. The object classifier 114 may be trained to classify using one or more of RGB images, grayscale images, infrared images, or corresponding video.

In some implementations, object classifier 114 may classify an object using one or more of a single image captured by the self-powered camera 110 when an object is detected, multiple images captured around the time when the self-powered camera 110 detected the object, or a short video corresponding to when the object detector 112 detected the object. In some implementations, the object classifier 114 may determine portions in the image where the object is located and crop the image to those portions. Cropping an image may reduce a size of the image to reduce bandwidth and battery power usage from wireless transmission of the image while showing the object in its entirety.

The notification trigger engine 116 may determine whether to provide a notification of the detected object based on the classification of the object. For example, the engine 116 may receive a classification of "deer" and, in response, determine to provide a notification that a deer is detected to the user device 120. The engine 116 may determine whether to send a notification based at least on rules specified by a user through the user device 120. For example, the engine 116 may determine that rule has been received of "only send images of deer," determine that the classification of an object as a deer satisfies the rule of "send images of deer" as the type of wildlife matches and, in response, provide a notification to the user device 120. In another example, the engine 116 may determine that rule has been received of "only send images of deer," determine that the classification of an object as a squirrel does not satisfy the rule of "send images of deer" as the type of wildlife does not match and, in response, not provide a notification to the user device 120.

In some implementations, the notification trigger engine 116 may trigger notifications in real-time. For example, the notification trigger engine 116 may trigger a notification be generated as soon as the notification trigger engine 116 determines an object in an image has been classified as a type that satisfies a rule for triggering a notification. In some implementations, the notification trigger engine 116 may trigger notifications in batches. For example, the notification trigger engine 116 may trigger a notification be generated every three, six, or some other number of hours to indicate whether an object has been classified as a type that satisfies a rule for triggering a notification during that time period. An example, batch of notifications may be, "Deer—4:35 AM," "Coyote—5:06 AM," and "Turkey—6:17 AM."

In some implementations, the user may specify whether a notification for a particular type of wildlife should be provided in real-time or in a batch. For example, the user may specify to send notifications on deer in near real-time and send notification on turkeys in batches every six hours. In some implementations, if the camera 110 determines to send a notification in near real-time, the camera may additionally include batched notifications that have not yet been sent as combining notifications may be more power efficient than sending separate notifications as there may be power overhead for each notification.

In some implementations, the notification trigger engine 116 may additionally include rules that include other criteria specified by users through a user device. One such criteria may be size of the type of animal. For example, the self-powered camera 110 may receive a rule that specifies the user would like images of turkeys that are taller than one foot, two foot, some other height, the object classifier 114 may determine dimensions of the object in the image, the notification trigger engine 116 may determine whether the classification and dimensions of the object satisfy a notification rule and, in response to determining that the classification and dimensions of the object does satisfy a notification rule, determine to provide a notification. In another example, such criteria may include other criteria specified by a user such as a deer having antlers, a specific deer that matches one or more user-supplied images, or deer that are similar to deer in one or more user-supplied images. The notification trigger engine 116 may determine geometric based vectors on the face, markings, and shape/size of antlers, if the animal has any, on the user-supplied images and the images from the camera 110, and determine to generate a notification if the vectors match.

The notification generator 118 may obtain an indication to generate a notification and provide a notification to the user device 120. For example, the notification generator 118 may obtain an indication of "Send notification for deer" from the notification trigger engine 116 and, in response, provide a notification of "Deer detect, send image?" to the user device 120.

The notification generator 118 may generate a notification to provide in the form of a textual indication that indicates a type of animal classified and a time the image was captured. For example, the notification generator may generate a textual message of "Deer—4:35 AM." In some implementations, the user may specify using the user device 120 whether to transmit a textual indication, a thumbnail, or a full resolution camera for objects of different classification types. In the case where a user specifies a textual indication, the notification may include "Deer—4:35 AM, send image?" In the case where a user specifies a thumbnail image, the notification may include a cropped image. In the case where a user specifies a full resolution image, the notification may include an original image captured by the camera 110 that includes the deer.

After receiving the notification, the user may then use the user device 120 to request additional image information. For example, in response to receiving a textual indication on the user device 120, the user may use the user device 120 to request that indicates to transmit either a thumbnail or a full resolution image, e.g., sending a message of "Yes, thumbnail image," or "Yes, full image" from the user device 120 to the camera 110. In another example, in response to receiving a thumbnail image on the user device 120, the user may use the user device 120 to request the full image, e.g., sending a message of "Yes" or "Yes, full image" from the user device 120 to the camera 110.

In some implementations, the camera 110 may allow a user to physically interact with the camera 110 to specify rules for triggering notifications. For example, the camera 110 may include a screen and buttons through which the user may specify types of wildlife and email addresses or phone numbers to which to send notifications.

Figure 2:
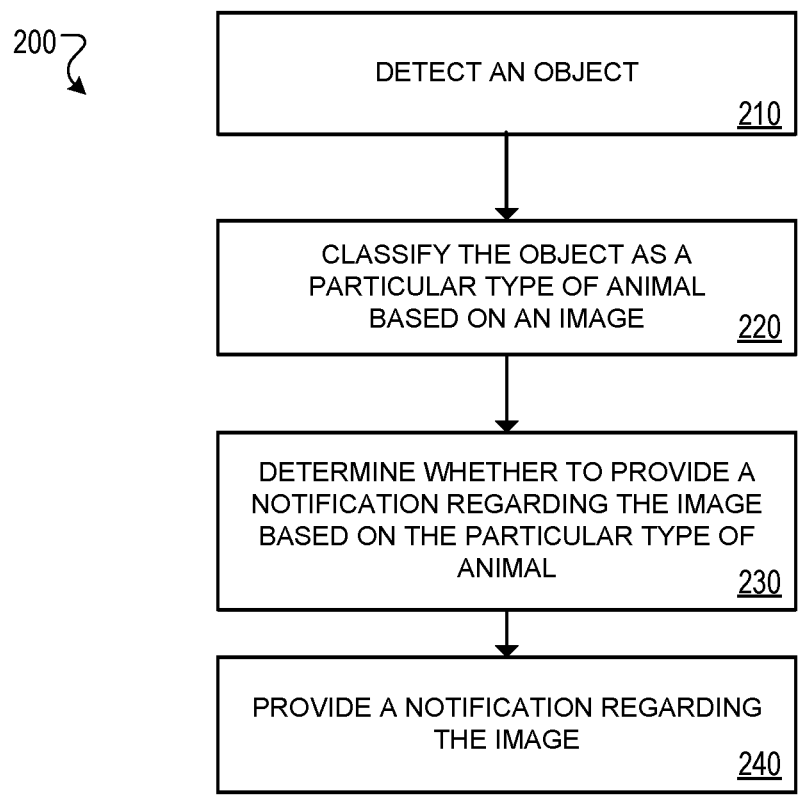
FIG. 2 is a flow diagram of an example process for monitoring wildlife using a self-powered camera.

FIG. 2 is a flow diagram of an example process 200 for monitoring wildlife using a self-powered camera. The process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes detecting an object (210). For example, the object detector 112 of the camera 110 may obtain data indicating a new heat source has been detected by a heat sensor in the camera and, in response to the data indicating a new heat source, analyze images captured by the camera 110 after the new heat source is detected with a neural network trained to detect a moving object from changes in a sequence of images. In some implementations, detecting an object may include detecting an object near a camera. For example, any object whose emitted heat sensed by a heat sensor of the camera 110 or that appears in an image captured by the camera 110 may be considered near the camera 110.

In some implementations, detecting an object near a camera includes detecting a new source of heat with a heat sensor in the camera and in response to detecting a new source of heat with the heat sensor in the camera, determining that the object is detected. For example, when a deer comes near the camera 110, the camera 110 may determine that the heat sensor has detected a source of heat that previously was not present and, in response, detect the new source of heat as an object.

In some implementations, detecting an object near a camera includes detecting a new source of heat with a heat sensor in the camera, in response to detecting a new source of heat with the heat sensor in the camera, determining from multiple images that include the image that the object is moving, and in response to determining from the multiple images that include the image that the object is moving, determining that the object is detected. For example, when a deer comes near the camera 110, the camera 110 may determine that the heat sensor has detected a source of heat that previously was not present and, in response, analyze images of a current view of the camera 110 and determine an object is moving in the images, and, in response to determining the images include an object that is moving, determine that an object is detected.

In some implementations, determining from multiple images that include the image that the object is moving may include providing the multiple images as input to a neural network that is trained to detect moving objects in sequences of images and receiving an indication that the multiple images include a moving object as an output from the neural network. For example, the images of the moving deer may be provided to a neural network that provides an output of "moving object detected." In another example, multiple images with no object moving between the images may be provided to a neural network that provides an output of "no moving object detected."

In some implementations, the moving object may be detected in images based on the location where the heat sensor indicated a new source of heat was located at the time the images were captured. For example, if the heat sensor indicates a new source of heat appeared in a lower left of camera's view, the camera 110 may determine whether there is a moving object in the lower left of the images and not analyze the other portions of the images.

The process 200 includes classifying the image as a particular type of animal (220). For example, the object classifier 114 may obtain images of the object provide the images as input to a neural network that is trained to classify wildlife where the output of the neural network is a classification. Classifying the image as a particular type of animal may include classifying an object in an image as a particular type of animal based on an appearance of the object in the image. For example, the camera 110 may classify the image as a deer in response to determining that from the appearance of the object in the image, the object is a deer.

In some implementations, classifying the object as a particular type of animal based on an appearance of the object in an image captured by the camera includes providing the image as input to a neural network trained to classify objects from images and receiving an indication of the particular type of animal as an output from the neural network. For example, the camera 110 may provide images of a deer to a neural network and receive an output of "deer" from the neural network. In another example, the camera 110 may provide images of a squirrel to a neural network and receive an output of "squirrel" from the neural network.

The process 200 includes determining whether to provide a notification regarding the image based on the particular type of animal (230). For example, the notification trigger engine 116 may obtain a classification for an object as a deer, determine that a rule is stored on the camera 110 that specifies that the user would like to receive notifications with textual indications of deer and, in response to determining that the rule is stored on the camera 110 that specifies that the user would like to receive notifications with textual indications of deer, determine to trigger a notification.

In some implementations, determining whether to provide a notification regarding the image based on the particular type of animal includes obtaining multiple rules that specify for which types of animals notifications should be provided and determining that the particular type of animal that the object is classified as matches a type of animal for which a particular rule of the multiple rules specifies notifications should be provided. For example, the notification trigger engine 116 may receive an indication that the object detected is a deer, obtain all rules for notifications stored on the camera 110, filter to a single rule that specifies deer, and, in response, provide a notification according to the single rule.

In some implementations, the particular rule specifies a size of the type of animal for which notifications should be provided and providing the notification regarding the image is in response to determining that a size of the object satisfies the size of the type of animal specified by the particular rule. For example, a rule may specify only providing a notification for a deer with antlers. In the example, the notification trigger engine 116 may filter rules to only those that are for a deer, determining that there are no rules for providing a notification simply based on that an object is a deer but there is a rule for providing a notification for a deer with an additional requirement that the deer has antlers, in response to that determination, perform further visual analysis on the image to determine whether the deer in the image has antlers, and, in response to determining that the deer has antlers, determining to provide a notification.

The process 200 includes providing a notification regarding the image (240). For example, the notification generator 118 may obtain an instruction from the notification trigger engine 116 to generate a notification that includes a textual indication that a deer is detected and, in response, generate the notification and wirelessly transmit the notification to the user device 120.

In some implementations, providing the notification regarding the image includes providing text that indicates that an image of an animal of the particular type was captured. For example, the notification may be a SMS text message that says "Deer detected, reply with 'Send' if you'd like to receive a corresponding image." In some implementations, providing the notification regarding the image includes providing the image. For example, the notification may be a MMS text message that includes the image that is sent without any input provided by a user after the image is captured. In some implementations, providing the notification regarding the image includes providing a version of the image that is cropped to reduce portions of the image that do not include the object. For example, the image of the deer may be cropped so that the borders are reduced to the smallest size possible while still including all parts of the deer that are visible in the image.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   detecting a new source of heat with a heat sensor in a camera;
   based on detecting the new source of heat with the heat sensor in the camera, providing images captured by the camera to a first neural network that is trained to detect moving objects;
   receiving an indication from the first neural network that the images depict a moving object;
   in response to receiving the indication from the first neural network that the images depict a moving object, providing the images to a second neural network that is trained to classify whether an object is the particular type of animal;
   receiving an indication from the second neural network that the object is classified as the particular type of animal by the second neural network based on an appearance of the object in the images captured by the camera;
   determining whether to provide a notification regarding the images based on the particular type of animal that the object is classified as; and
   in response to determining to provide a notification regarding the images based on the particular type of animal that the object is classified as, providing the notification regarding the images.

2. The method of claim 1, wherein determining whether to provide a notification regarding the images based on the particular type of animal that the object is classified as comprises:
   obtaining multiple rules that specify for which types of animals notifications should be provided; and determining that the particular type of animal that the object is classified as matches a type of animal for which a particular rule of the multiple rules specifies notifications should be provided.

3. The method of claim 2, wherein the particular rule specifies a size of the type of animal for which notifications should be provided and providing the notification regarding the images is in response to determining that a size of the object satisfies the size of the type of animal specified by the particular rule.

4. The method of claim 1, wherein providing the notification regarding the images comprises:
providing text that indicates that of an animal of the particular type were captured.

5. The method of claim 4, comprising:
receiving an indication to provide the images; and
in response to receiving the indication to provide the images, provide the images.

6. The method of claim 1, wherein providing the notification regarding the images comprises:
providing the images.

7. The method of claim 1, wherein providing the notification regarding the images comprises:
providing a version of an image in the images that is cropped to reduce portions of the image that do not include the object.

8. A system comprising:
one or more computers and one or more storage devices storing instructions that are operable, when executed by the one or more computers, to cause the one or more computers to perform operations comprising:
detecting a new source of heat with a heat sensor in a camera;
based on detecting the new source of heat with the heat sensor in the camera, providing images captured by the camera to a first neural network that is trained to detect moving objects;
receiving an indication from the first neural network that the images depict a moving object;
in response to receiving the indication from the first neural network that the images depict a moving object, providing the images to a second neural network that is trained to classify whether an object is the particular type of animal;
receiving an indication from the second neural network that the object is classified as the particular type of animal by the second neural network based on an appearance of the object in the images captured by the camera;
determining whether to provide a notification regarding the images based on the particular type of animal that the object is classified as; and
in response to determining to provide a notification regarding the images based on the particular type of animal that the object is classified as, providing the notification regarding the images.

9. The system of claim 8, wherein determining whether to provide a notification regarding the images based on the particular type of animal that the object is classified as comprises:
obtaining multiple rules that specify for which types of animals notifications should be provided; and
determining that the particular type of animal that the object is classified as matches a type of animal for which a particular rule of the multiple rules specifies notifications should be provided.

10. The system of claim 9, wherein the particular rule specifies a size of the type of animal for which notifications should be provided and providing the notification regarding the images is in response to determining that a size of the object satisfies the size of the type of animal specified by the particular rule.

11. The system of claim 8, wherein providing the notification regarding the images comprises:
providing text that indicates that of an animal of the particular type were captured.

12. A non-transitory computer-readable medium storing software comprising instructions executable by one or more computers which, upon such execution, cause the one or more computers to perform operations comprising:
detecting a new source of heat with a heat sensor in a camera;
based on detecting the new source of heat with the heat sensor in the camera, providing images captured by the camera to a first neural network that is trained to detect moving objects;
receiving an indication from the first neural network that the images depict a moving object;
in response to receiving the indication from the first neural network that the images depict a moving object, providing the images to a second neural network that is trained to classify whether an object is the particular type of animal;
receiving an indication from the second neural network that the object is classified as the particular type of animal by the second neural network based on an appearance of the object in the images captured by the camera;
determining whether to provide a notification regarding the images based on the particular type of animal that the object is classified as; and
in response to determining to provide a notification regarding the images based on the particular type of animal that the object is classified as, providing the notification regarding the images.

13. The medium of claim 12, wherein determining whether to provide a notification regarding the images based on the particular type of animal that the object is classified as comprises:
obtaining multiple rules that specify for which types of animals notifications should be provided; and
determining that the particular type of animal that the object is classified as matches a type of animal for which a particular rule of the multiple rules specifies notifications should be provided.

14. The medium of claim 13, wherein the particular rule specifies a size of the type of animal for which notifications should be provided and providing the notification regarding the images is in response to determining that a size of the object satisfies the size of the type of animal specified by the particular rule.

15. The medium of claim 12, wherein providing the notification regarding the images comprises:
providing text that indicates that images of an animal of the particular type were captured.

16. The medium of claim 15, comprising:
receiving an indication to provide the images; and
in response to receiving the indication to provide the images, provide the images.

17. The medium of claim 12, wherein providing the notification regarding the images comprises:
providing the images.

18. The medium of claim 12, wherein providing the notification regarding the images comprises:
provideing a version of an image in the images that is cropped to reduce portions of the image that do not include the object.

19. The medium of claim 12, wherein classification performed by the second neural network is more power intensive than detection performed by the first neural network, and detection performed by the first neural network is more power intensive than detection performed by the heat sensor.

\* \* \* \* \*